United States Patent [19]

Bedol

[11] Patent Number: 5,828,587
[45] Date of Patent: Oct. 27, 1998

[54] ATTACHMENT APPARATUS FOR CHECKBOOK COVER AND METHOD OF USE THEREOF

[76] Inventor: Mark A. Bedol, 3423 Yankton Ave., Claremont, Calif. 91711

[21] Appl. No.: 851,690

[22] Filed: May 6, 1997

[51] Int. Cl.[6] .............................. G06F 19/00; G06F 15/02
[52] U.S. Cl. ...................................................... 364/705.02
[58] Field of Search ........................... 364/705.02, 708.1; 361/683

[56] References Cited

U.S. PATENT DOCUMENTS

| | | | |
|---|---|---|---|
| 4,075,702 | 2/1978 | Davies | 364/705.02 |
| 4,224,675 | 9/1980 | Pinkermal | 364/705.02 |
| 4,751,664 | 6/1988 | Holm | 364/705.02 |
| 4,768,648 | 9/1988 | Glass | 364/708.1 |
| 5,093,760 | 3/1992 | Bedol | 361/392 |
| 5,258,935 | 11/1993 | Ure | 364/705.02 |

*Primary Examiner*—David H. Malzahn

[57] ABSTRACT

The attachment apparatus includes a thin functional assembly and a thin clip assembly. A first portion of the thin clip assembly is rotatably connected to the thin functional assembly. A clip portion of the thin clip assembly, which is connected to the first portion, provides attachment to a checkbook cover.

17 Claims, 2 Drawing Sheets

ATTACHMENT APPARATUS FOR CHECKBOOK COVER AND METHOD OF USE THEREOF

BACKGROUND OF THE INVENTION

1. Field of the Invention

The present invention relates to checkbooks and attachments thereto and more particularly to an attachment which has a hinged connection and an advantageous clip assembly for efficient utilization of a checkbook.

2. Description of the Related Art

The efficient use of checkbooks is generally dependent on utilizing an electronic calculator. Generally, the calculator is stored independent of the checkbook, including its register.

U.S. Pat. No. 4,075,702, issued to D. C. Davies discloses an enclosure having a pair of foldable flat members in which one of the flat members is adapted for supporting the electronic components of the calculator and the other flat member is adapted for folding over in facing relationship with the first. The facing flat member is adapted for carrying a notepad, blank checks, credit cards, or the like. The Davies device does not provide the capability to efficiently use a check register.

U.S. Pat. No. 5,093,760, issued to present applicant M. A. Bedol, discloses a clip-on calculator assembly comprising a thin calculator housing containing a calculator and a thin resilient clip disposed about the outer periphery of the calculator housing. The clip is integrally connected to a portion of the calculator housing. Spaces are formed between the outer periphery of the housing and the resilient clip for allowing paper or the like to be positioned between the outer periphery and the resilient clip, thereby clipping the same to the calculator.

OBJECTS AND SUMMARY OF THE INVENTION

A principal object of the present invention is to enhance the capabilities of the checkbook. Another object is to provide attachment of a calculator to a checkbook while not impeding storage of the checkbook register.

These and other objects are achieved by the present attachment apparatus for use with a checkbook cover. The attachment apparatus includes a thin functional assembly and a thin clip assembly. A first portion of the thin clip assembly is rotatably connected to the thin functional assembly. A clip portion of the thin clip assembly, which is connected to the first portion, provides attachment to a checkbook cover.

As will be disclosed in detail below, this combination of a clip assembly which is rotatably connected to the functional assembly with a clip portion provides very efficient use of checkbooks including their registers. The functional assembly, e.g. calculator, can be used without removing it from the checkbook cover. Furthermore, when the calculator is in a stowed position it can serve as a page marker in the checkbook register.

Other objects, advantages, and novel features will become apparent from the following detailed description of the invention when considered in conjunction with the accompanying drawings.

BRIEF DESCRIPTION OF THE DRAWINGS

FIG. 2 is a view taken along Line 2—2 of FIG. 1.

FIG. 3 is a view taken along Line 3—3 of FIG. 1.

The same parts or elements throughout the drawings are designated by the same reference characters.

DETAILED DESCRIPTION OF THE PREFERRED EMBODIMENTS

Figure 1:
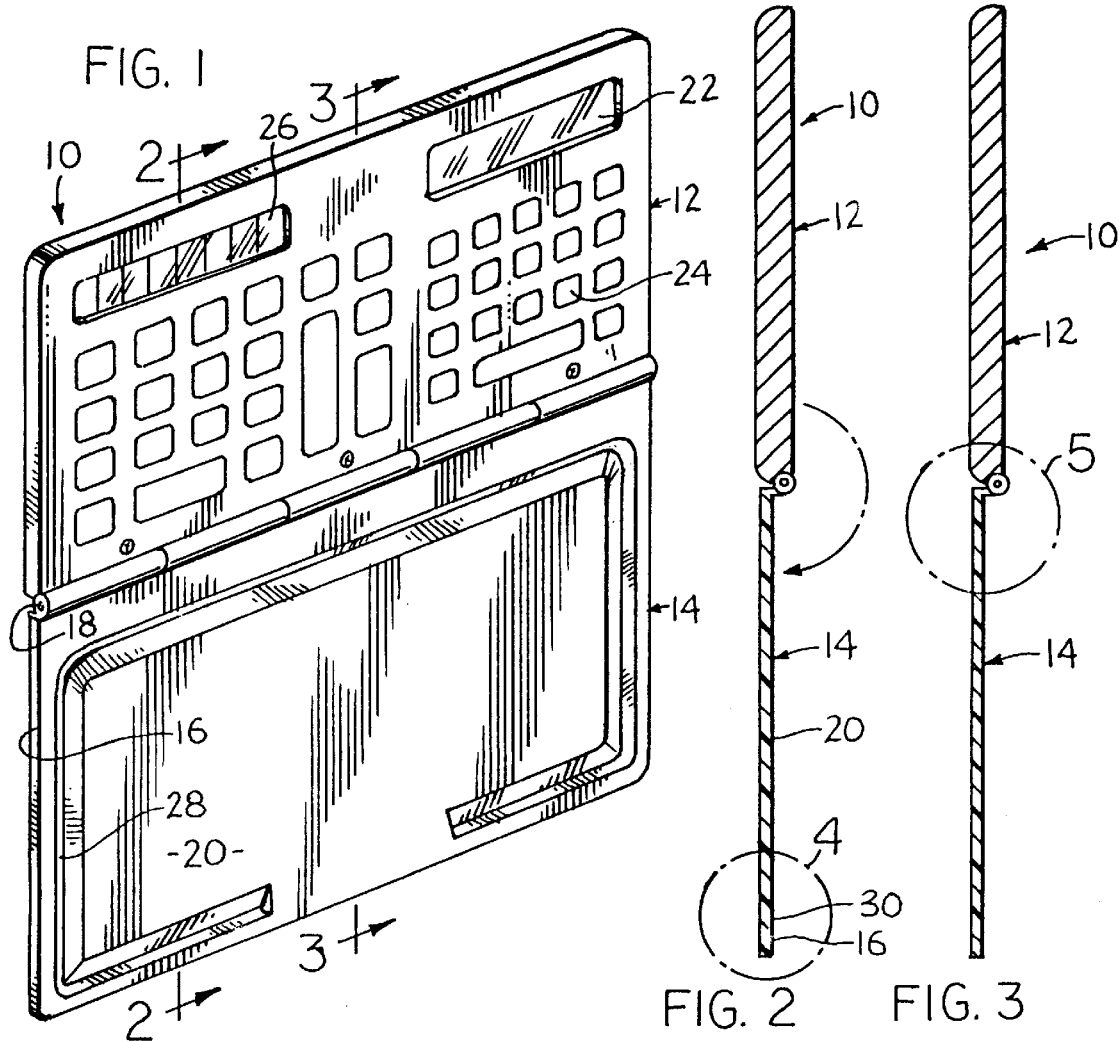
FIG. 1 is a perspective view of the attachment apparatus for use with a checkbook cover, of the present invention.
Figure 1A:
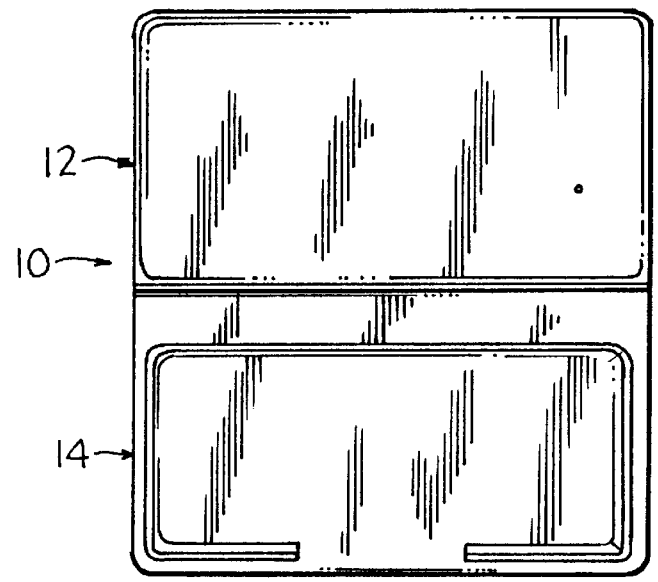
FIG. 1A is a view of the backside of the attachment apparatus of FIG. 1.

Referring now to the drawings and the characters of reference marked thereon FIGS. 1 and 1A illustrate the attachment apparatus of the present invention, designated generally as 10. The apparatus 10 includes a thin functional assembly, i.e. electronic calculator 12, and a thin clip assembly 14. A first portion 16 of the clip assembly 14 is hingedly connected, via hinge assembly 18, to the electronic calculator 12. A clip portion 20 of the clip assembly 14 is integrally connected to the first portion 16 at a lower end of the clip assembly 14. For the reasons discussed below, the first portion 16 is sized to have about the same width or a slightly smaller width of the checkbook cover.

The electronic calculator 12 contains the necessary electronic components, etc., for a calculator such as a display 22 and numbers and functions 24. The calculator may be of the solar powered type, as shown by power cells 26, for the purposes of illustration and not limitation.

The housing of the calculator is preferably formed of a thin rigid plastic material. It has an overall thickness in a range of about between 2/32" and 10/32" thick, preferably approximately 5/32".

The clip assembly 14 is preferably a one-piece molded plastic unit which is substantially thinner than the electronic calculator 12. Clip assembly 14 has an overall thickness in a range of between about 1/32" and 3/16", preferably about approximately 1/16".

The first portion 16 is disposed about an outer periphery of the clip portion 20 such that spaces 28, forming a "C" shape, are defined between the outer periphery of the clip portion 20 and the first portion 16. As can be readily seen in FIGS. 2 and 3, prior to attachment of the assembly 10 to a checkbook, the first portion 16 and the clip portion 20 are disposed on the same plane in an unclipped position.

Figure 4:
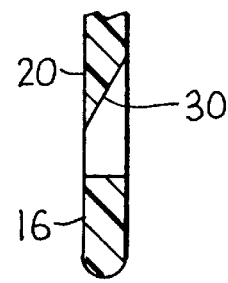
FIG. 4 is a view taken along Section 4 of FIG. 2.
Figure 5:
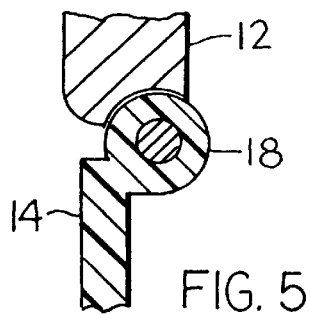
FIG. 5 is a view taken along Section 5 of FIG. 3.

Referring to FIG. 4, it can be seen that the edge 30 of the clip portion 20 is beveled to allow the assembly 10 to be easily secured to a checkbook cover, as will below be disclosed in detail. FIG. 5 illustrates the hinging mechanism 18.

Figure 6:
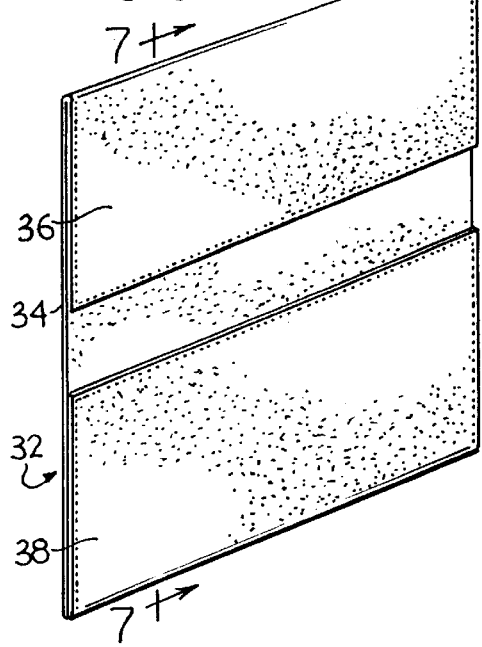
FIG. 6 (Prior Art) is a perspective view of a checkbook cover in an open position.
Figures 7, 9:
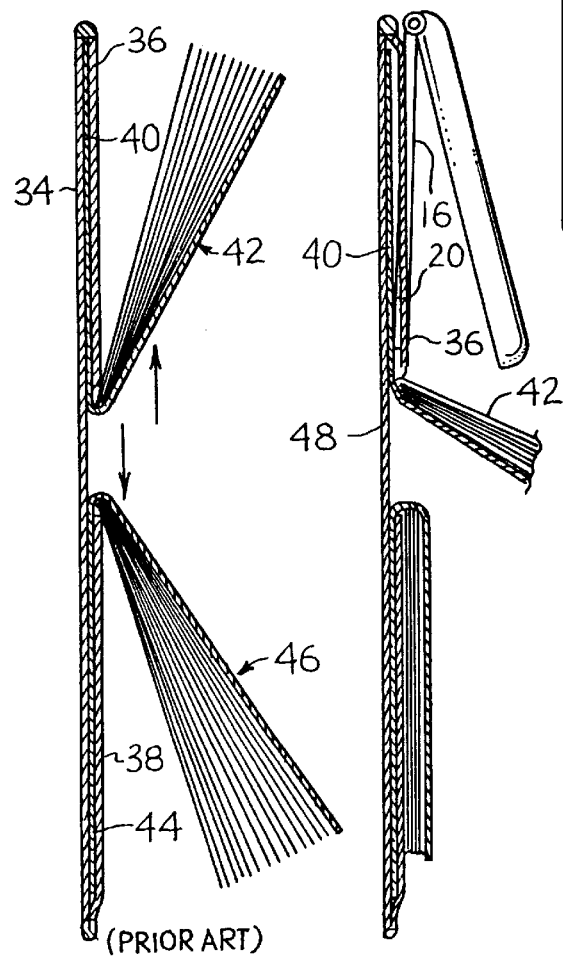
FIG. 7 (Prior Art) is a view taken along Line 7—7 of FIG. 6, showing the addition of a checkbook and check register.
FIG. 9 is a side view of the checkbook and attachment system with the attachment apparatus shown partially open.

Referring now to FIG. 6 (Prior Art) a conventional checkbook cover is illustrated, designated generally as 32. Such checkbook cover includes an outer section 34. The register inner section 36 is attached at a portion of its periphery to a portion of the periphery of the outer section 34 to form a register pocket. Similarly, a checkbook section 38 is attached at a portion of its periphery to a portion of the periphery of the outer section 34 to form a checkbook pocket. Thus, as can be seen in FIG. 7 (Prior Art), a checkbook is conventionally used by positioning a front cover 40 of a register 42 in the pocket between the outer section 34 and the register inner section 36. A back cover 44 of the checkbook 46 is positioned in the pocket between the outer section 34 and the checkbook inner section 38.

Figure 8:
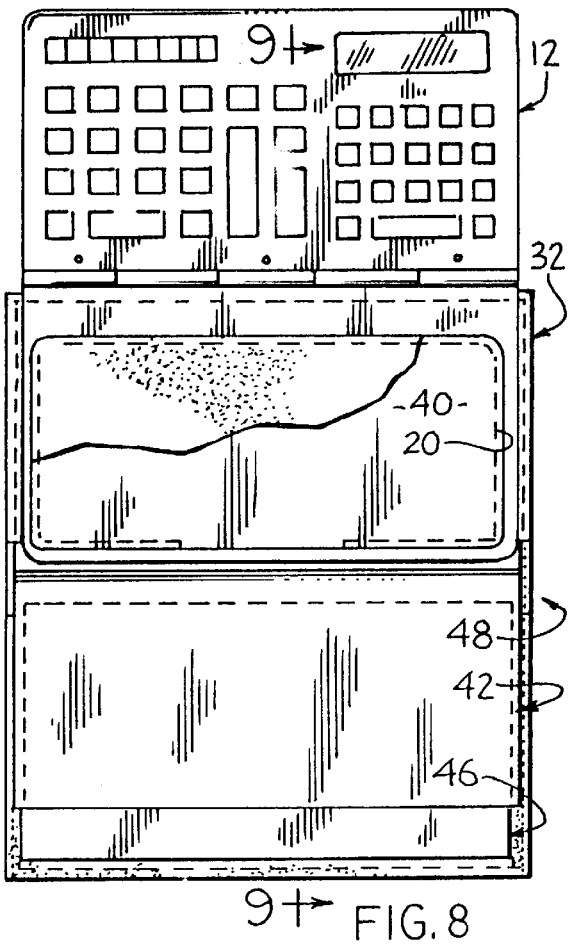
FIG. 8 is a front view of the checkbook and attachment system of the present invention.

Referring to FIGS. 8–9, in use, the clip portion 20 of the attachment apparatus 10 is slipped between the front cover 40 of the register 42 and the register inner section 36 within the register pocket. A resultant checkbook and attachment system 48 is established. Thus, the calculator 12 and the checkbook register can be conveniently and simultaneously accessed. Pages in the register 42 can be turned without interfering with the use of the calculator and without the need to detach the calculator 12 from the checkbook cover 32. The flat clip portion 20 of the clip assembly 14 provides a suitable writing support.

Figure 10:
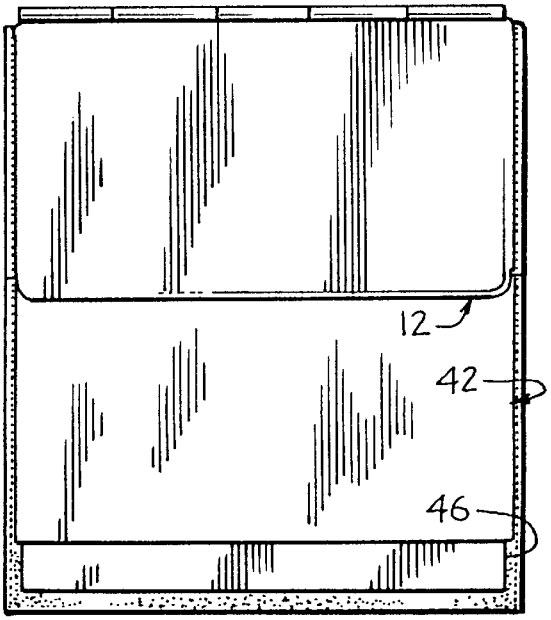
FIG. 10 shows the attachment apparatus in a closed position and the register opened to at least one page.

When the attachment apparatus 10 is closed, the calculator 12 may be folded down between two desired pages in the register 42 to serve as a marker. This position is illustrated in FIG. 10.

The entire system 48 may be closed by folding the checkbook cover 32.

Although the functional assembly 12 described specifically herein is an electronic calculator, it is understood that other functional assemblies can be substituted. For example, the functional assembly 12 could be a memo pad, a stamp, such as a rubber endorsement stamp, a storage member such as for postage stamps or for a writing instrument, a checkbook pocket secretary, an electronic databank or a digital sound recorder.

Obviously, many modifications and variations of the present invention are possible in light of the above teachings. It is, therefore, to be understood that within the scope of the appended claims, the invention may be practiced otherwise than as specifically described.

What is claimed and desired to be secured by Letters Patent of the United States is:

1. An attachment apparatus for use with a checkbook cover, comprising:
   a) a thin functional assembly; and
   b) a thin clip assembly, comprising:
      i) a first portion rotatably connected to said thin functional assembly; and
      ii) a clip portion connected to said first portion for providing attachment to a checkbook cover.

2. The apparatus of claim 1, wherein said thin functional assembly comprises an electronic calculator.

3. The apparatus of claim 1, wherein said first portion is disposed about an outer periphery of said clip portion, said clip portion being integrally connected to a section of said first portion, wherein spaces are defined between the outer periphery of said clip portion and said first portion for allowing a portion of a checkbook cover to be positioned therebetween, thereby clipping the attachment apparatus to the checkbook cover.

4. The apparatus of claim 3, wherein said first portion and said clip portion are integrally connected at a lower end of said clip assembly, an upper end of said clip assembly being hingedly connected to said thin functional assembly.

5. The apparatus of claim 4, wherein said defined spaces form a "C" shape.

6. The apparatus of claim 1, wherein said clip portion is formed of a rigid plastic.

7. The apparatus of claim 1, wherein said first portion and said clip portion are disposed on the same plane in an un-clipped position.

8. The apparatus of claim 1, wherein said thin clip assembly has a thickness in a range of between about 1/32" and 3/16".

9. The apparatus of claim 1, wherein said clip portion is so sized as to fit within a register pocket of a checkbook cover.

10. The apparatus of claim 9, wherein said first portion is sized to have about the same width or a slightly smaller width of a checkbook cover.

11. The attachment apparatus of claim 1, wherein said thin functional assembly comprises an electronic device.

12. A checkbook and attachment system, comprising:
   a) a checkbook cover comprising:
      i) an outer section; and
      ii) an inner section attached at a portion of its periphery to a portion of a periphery of said outer section,
      said outer section and said inner section cooperating to form a pocket, and
   b) an attachment apparatus, comprising:
      i) a thin functional assembly; and
      ii) a thin clip assembly, comprising:
         a first portion rotatably connected to said thin functional assembly; and
         a clip portion connected to said first portion for providing attachment to said checkbook cover, wherein
      said first portion is so sized to fit within said pocket.

13. The checkbook and attachment system of claim 12, wherein said thin functional assembly comprises an electronic calculator.

14. The apparatus of claim 12, wherein said first portion is disposed about an outer periphery of said clip portion, said clip portion being integrally connected to a section of said first portion, wherein spaces are defined between the outer periphery of said clip portion and said first portion for allowing a portion of a checkbook cover to be positioned therebetween, thereby clipping the attachment apparatus to the checkbook cover.

15. The checkbook and attachment system of claim 12, wherein:
   said inner section is a register inner section and said pocket is a register pocket, said checkbook cover further including a checkbook inner section attached at a portion of its periphery to another portion of the periphery of said outer section, said outer section and said checkbook inner section cooperating to form a checkbook pocket;
   said first portion of said thin clip assembly is disposed about an outer periphery of said clip portion, said clip portion being integrally connected to a section of said first portion, spaces being defined between the outer periphery of said clip portion and said first portion for allowing portions of said register inner section to be positioned therebetween; and
   said first portion and said clip portion are integrally connected at a lower end of said clip assembly, an upper end of said clip assembly being rotatably connected to said thin functional element; wherein, when said clip portion is positioned within said register pocket and a front cover of the checkbook register is also positioned in said register pocket, the checkbook and attachment system may be maintained in
a) a closed position, said outer section of said checkbook cover folded in half, with the checkbook register and the attachment apparatus being maintained between the two halves of the outer section, and
b) an open position, with the rotatable connection between the first portion and the thin functional element being open to provide usable access to said thin functional assembly.

16. The checkbook and attachment system of claim 15, wherein said thin functional assembly comprises an electronic calculator.

17. The checkbook and attachment system of claim 15, wherein said thin functional assembly comprises an electronic device.

\* \* \* \* \*